United States Patent Office 2,770,046
Patented Nov. 13, 1956

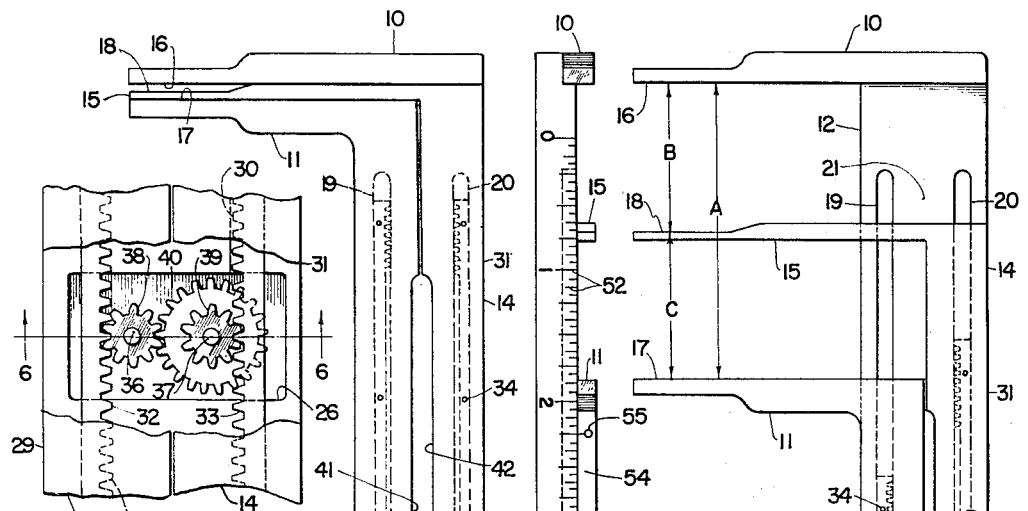

2,770,046

MEASURING INSTRUMENT

Wilhelm Wichmann, Clifton, N. J.

Application March 4, 1955, Serial No. 492,084

1 Claim. (Cl. 33—143)

This invention relates to measuring instruments—and more particularly to caliper dividers.

It is primarily within my contemplation to provide a caliper device having an intermediate divider element which automatically divides the distance between the two main measuring jaws into two parts of predetermined proportions. More specifically, it is my object to provide a novel form of caliper—for either inside or outside measurements—in which an intermediate divider element will automatically and continuously move, coactively with the operative actuation of the movable measuring jaw, so that its distance from the stationary jaw is a predetermined fraction of the distance of said movable jaw from said stationary one.

It is a further object of my invention to enable a ready interchange of components so as to effect predetermined changes in the ratio of the divided distances.

And it is within the contemplation of this invention to provide a relatively simple and readily fabricated device capable of performing the functions hereabove described.

Other objects, features and advantages will appear from the drawings and the description hereinafter given.

Referring to the drawings,

Figure 1 is a plan view of a form of caliper divider according to my invention, with the measuring and dividing members shown in open and separated position, the dividing element being shown midway between the two main measuring jaws.

Figure 2 is a side view of Figure 1.

Figure 3 is a view like Figure 1, but with the measuring members in contiguous closed positions.

Figure 4 is an end view of Figure 3.

Figure 5 is an enlarged fragmentary plan view showing a portion of Figure 1, a section being removed for clarity.

Figure 6 is a section of Figure 5 taken along line 6—6.

Figure 7 is an enlarged section of Figure 3 taken along line 7—7.

Figure 8 is a fragmentary plan view, substantially like Figure 5, but showing geared means for producing a one-third division of the distance between the two main measuring jaws.

Figure 9 is a section of Figure 8 taken along line 9—9.

In the form of my invention illustrated, the two opposite main measuring jaws 10 and 11 are carried by the stationary supporting bar 12 and the overlying inner plate 13, respectively, these extending longitudinally of the device and being shown at right angles to the transversely extending jaws 10 and 11. Also overlying bar 12 and in parallel adjacent relation to plate 13 is the outer plate 14 carrying the transverse divider member 15 intermediate jaws 10 and 11. As will more clearly hereinafter appear, plate 13 is movable, by manually manipulating the knob 56 attached thereto, relative to stationary bar 12, so as to vary the distance A between the inner measuring faces 16 and 17 of said jaws 10 and 11, respectively; and during such movement, by a system of gearing to be described, plate 14 is also moved, but at a predetermined slower rate, so as to divide distance A into the two distances B and C, measured from said respective faces 16 and 17 to the divider measuring face 18. In the form shown, the spaces B and C are equal, the divider element 15 being at all times, according to this embodiment of my invention, operative midway between the main measuring jaws 10 and 11.

The main supporting bar 12 has therein two parallel longitudinal slots or recessed portions 19 and 20 flanking the central wall 21, the upper surface 22 of which is in the same plane as the upper surfaces 23 and 24 constituting the outer marginal walls of bar 12. Disposed toward the rear end 25 of said bar 12 and between said marginal walls 23 and 24 is the cavity 26 for accommodating the cluster of gears generally designated 27.

Secured to the underside of plate 13 is the longitudinal rack 28, said rack being spaced from the inner edge 29 of plate 13, and proportioned in length and thickness so as to fit into said recess 19. Similarly, the plate 14 has secured to its underside the longitudinal rack 30 spaced from the outer edge 31 thereof and proportioned in length and thickness so as to fit into said recess 20. Said racks are parallel to each other, with their respective teeth 32 and 33 equal in pitch and size, and in facing relation, the drawings showing the racks secured to their respective plates by the rivets 34.

Extending upwardly from the base 35 of the cavity 26 are the two vertical shafts 36 and 37 over which are rotatably mounted the gears 38, 39 and 40—the extended hub 41 of gear 39 being pressed into gear 40 so that gears 39 and 40 are in fixed relation. Gears 38 and 39 are of equal diameters and contain the same number and size of teeth—said gears being in operating engagement with the said racks 28 and 30, respectively. Gear 38 is of a thickness substantially equal to the combined thickness of gears 39 and 40, the arrangement being such that gear 38 is in engagement with gear 40. In the construction illustrated, gear 40 is twice the diameter of gear 38 and has twice the number of teeth, whereby for every turn of gear 38 the gears 40 and 39 rotate as a unit, through one-half revolution.

The said plates 13 and 14 are slidably mounted over the surfaces 22, 23 and 24 of the bar 12, and they constitute closures for the cavity 26 and covers for said cluster of gears 27. The said plates have the adjacent opposing recessed portions 41 and 42, providing an elongated aperture 43 through which extends the post 44 attached to the body of bar 12. The aperture 43 is so proportioned as to slidably accommodate therein said post during the relative operative movement of said plates 13 and 14. The upper threaded portion 44a of post 44 has mounted thereover the nut 45 and washer 46, so that upon an operative tightening of the nut the said plates 13 and 14 are frictionally held in the relative positions against further movement.

In the operation of this device, the jaws 10 and 11 are operatively separated to the distance A (representing the dimension of a length being measured) by grasping the knob 56, as aforesaid, and slidably moving plate 13 relative to stationary bar 12. This will cause the rack 28 to rotate gear 38, which in turn will rotate gears 40 and 39; and since gear 39 is in engagement with the rack 30, the said rack and its plate 14 will be correspondingly moved, carrying the divider member 15 along with it. A previously indicated, gear 39 revolves half the peripheral distance of gear 38, hence plate 14 and its divider member 15 will move longitudinally half the linear distance traversed by the plate 13 and its jaw 11.

It is accordingly evident that for all distances A between the jaws 10 and 11, the distance B between the divider 15 and jaw 10 is one-half said distance A. In other words, member 15 divides the distance between the jaws into equal parts.

If it is desired to change the gear ratios to obtain a different division of the space A by the divider 15, a new cluster of gears 47 (Figures 8 and 9) can be substituted in place of gear cluster 27. The nut 45 is unscrewed, the two plates 13 and 14 lifted off the bar 12, and gears 38, 39 and 40 lifted off the shafts 36 and 37. Then cluster 47 is placed over said shafts, the axial distance between the coacting gears 48, 49 and 50, 51 being equal to the distance between shafts 36 and 37.

The extension hub 52a of gear 48 is in press-fitted engagement with gear 49, and the extension hub 53a is in press-fitted engagement with gear 50, whereby gears 48 and 49 rotate as a unit, and gears 50 and 51 similarly rotate as a unit. Gear 48 is in engagement with gear 50, the diameter ratio in the particular embodiment illustrated being one to three, gear 50 having three times the number of teeth as gear 48. Gears 49 and 51 are identical in diameter and in the number and size of teeth, the former being engageable with rack 28 and the latter with rack 30. With cluster of gears 47 in place, the distance B will always be one-third of distance A.

The scale markings 52 are, in the form shown, on the side surfaces 53 of bar 12, the adjacent side surface 54 of plate 13 bearing thereon the indicator marking 55, which is in registry with the "0" reading when the members 10, 11 and 15 are in their closed positions shown in Figure 3. The arrangement is such that the indicator 55 will at all times give the distance between faces 16 and 17 of the respective jaws 10 and 11, one-half of said reading being the distance between said face 16 and the face 18 of divider 15.

In the above description, the invention has been disclosed merely by way of example and in preferred manner; but obviously many variations and modifications may be made therein. It is to be understood, therefore, that the invention is not limited to any specific form or manner of practicing same, except insofar as such limitations are specified in the appended claim.

I claim:

In a caliper device, a transverse stationary measuring jaw, a longitudinal supporting bar connected thereto, a second transverse movable jaw in cooperative relation to said stationary jaw, a longitudinal plate supporting said movable jaw and in slidable engagement with said bar, a transverse movable divider member disposed intermediate said jaws, a second longitudinal plate supporting said divider member and in slidable engagement with said bar, said plates being parallel to each other and disposed on opposite lateral sides of one surface of said bar, said plates having recessed portions along adjacent edges thereof in facing relation, whereby an elongated aperture is formed therebetween, a post affixed to said bar and extending up through said aperture, a nut in threaded engagement with the outer end of said post and proportioned for pressing engagement with said two plates, whereby said plates are releasably held locked against movement, said bar having two longitudinal parallel grooves therein, each of said plates having a longitudinal gear rack extending into one of said grooves, rotatable gear means on said bar and in operative engagement with one of said racks, other rotatable gear means on said bar and in operative engagement with the other of said racks, both of said rotatable gear means being in operative engagement with each other, whereby the operative movement of said movable jaw and its plate will cause an operative movement of said second plate and a corresponding movement of the divider member.

References Cited in the file of this patent

UNITED STATES PATENTS

| 1,703,736 | Jacob | Feb. 26, 1929 |
| 2,557,944 | Crook | June 26, 1951 |

FOREIGN PATENTS

| 11,267 | Great Britain | Aug. 29, 1912 |